(12) United States Patent
Grubb

(10) Patent No.: US 10,520,954 B2
(45) Date of Patent: Dec. 31, 2019

(54) ACTIVE CANCELLATION OF A PULSATING FLOW WITH A FLOW SIGNAL NOISE REFERENCE

(71) Applicant: Norgren Limited, Lichfield, Staffordshire (GB)

(72) Inventor: Mark Richard Grubb, Burton-upon-Trent (GB)

(73) Assignee: NORGREN LIMITED (GB)

( * ) Notice: Subject to any disclaimer, the term of this patent is extended or adjusted under 35 U.S.C. 154(b) by 66 days.

(21) Appl. No.: 15/577,152

(22) PCT Filed: May 24, 2016

(86) PCT No.: PCT/GB2016/051488
§ 371 (c)(1),
(2) Date: Nov. 27, 2017

(87) PCT Pub. No.: WO2016/193670
PCT Pub. Date: Dec. 8, 2016

(65) Prior Publication Data
US 2018/0181146 A1    Jun. 28, 2018

(30) Foreign Application Priority Data
May 29, 2015    (GB) .................................. 1509228.1

(51) Int. Cl.
*G05D 7/06* (2006.01)
*G01F 15/02* (2006.01)
(Continued)

(52) U.S. Cl.
CPC ........... *G05D 7/0635* (2013.01); *G01F 15/02* (2013.01); *G05B 19/042* (2013.01);
(Continued)

(58) Field of Classification Search
CPC .................. G05D 7/0635; G01F 15/02; G05B 2219/37523; G05B 2219/41301
See application file for complete search history.

(56) References Cited

U.S. PATENT DOCUMENTS

| 5,492,451 A | * | 2/1996 | Franz | .................. | F04B 11/0075 |
| | | | | | 417/312 |
| 6,029,527 A | * | 2/2000 | Seitz | ....................... | G01F 1/363 |
| | | | | | 137/487 |

(Continued)

FOREIGN PATENT DOCUMENTS

| DE | 19536977 | 4/1996 |
| DE | 102011105027 | 12/2011 |
| EP | 2116752 | 11/2009 |

OTHER PUBLICATIONS

Nithin V. George, "Advances in active noise control: A survey, with emphasis on recent nonlinear techniques", [online], Aug. 2012 , [retrieved on Mar. 27, 2019], retrieved from <https://www.sciencedirect.com/science/article/pii/S0165168412002800> (Year: 2012)*

(Continued)

*Primary Examiner* — Thomas C Lee
*Assistant Examiner* — Charles Cai
(74) *Attorney, Agent, or Firm* — The Belles Group, P.C.

(57) ABSTRACT

An electronics for active cancellation of a pulsating flow with a flow signal noise reference. The electronics includes a signal processor configured to receive a flow signal from a flow sensor that is configured to measure a flow rate of the pulsating flow, generate a flow rate signal and a noise reference signal from the flow signal, and generate a cancelling signal from the noise reference signal. The electronics also includes a controller coupled to the signal processor and configured to determine a flow rate control signal. The electronics includes a signal generator communicatively coupled to the signal processor and the controller and (Continued)

configured to receive the flow rate control signal, generate a valve signal based on the flow rate control signal and the cancelling signal, and provide the valve signal to a valve to control flow rate and attenuate pulses of the pulsating flow of the fluid.

12 Claims, 6 Drawing Sheets

(51) Int. Cl.
      *G05B 19/042*     (2006.01)
      *G05B 19/4155*     (2006.01)
(52) U.S. Cl.
      CPC ............... *G05B 19/4155* (2013.01); *G05B 2219/37523* (2013.01); *G05B 2219/41301* (2013.01)

(56) References Cited

U.S. PATENT DOCUMENTS

| | | | | |
|---|---|---|---|---|
| 2004/0016230 A1* | 1/2004 | Hale | ............... | F04B 1/2021 |
| | | | | 60/413 |
| 2010/0319334 A1* | 12/2010 | Kley | ............... | B60T 8/4068 |
| | | | | 60/325 |
| 2012/0020807 A1 | 1/2012 | Fernholz et al. | | |
| 2014/0374634 A1* | 12/2014 | Ohtsuki | ............... | G05D 7/0635 |
| | | | | 251/129.06 |

OTHER PUBLICATIONS

Corresponding International Search Report and Written Opinion for PCT/GB2016/051488 dated Jul. 27, 2016. WO.

\* cited by examiner

ACTIVE CANCELLATION OF A PULSATING FLOW WITH A FLOW SIGNAL NOISE REFERENCE

CROSS-REFERENCE TO RELATED APPLICATIONS

This application is a U.S. national stage application under 35 U.S.C. § 371 of PCT Application No. PCT/GB2016/051488, filed May 24, 2016, which claims priority to United Kingdom Patent Application No. GB1509228.1, filed May 29, 2015, the entireties of which are incorporated herein by reference.

TECHNICAL FIELD

The embodiments described below relate to cancellation of a pulses in a pulsating flow and, more particularly, to active cancellation of a pulsating flow with a flow signal noise reference.

BACKGROUND

Fluid can be obtained from different sources, one of which is a pump that receives a fluid from a fluid supply, displaces the fluid with a mechanical means, and provides the fluid to, for example, a conduit. The mechanical means employed by the pump may be a member with a reciprocal motion, such as pistons, peristaltic rotors, or the like. The reciprocal motion periodically displaces the fluid towards the conduit, thereby causing the fluid to flow. Due to the reciprocal motion, the fluid provided by the pump may have pulses that are carried downstream through the conduit. Accordingly, the pulses are sometimes referred to as fluid born noise ("FBN"). Fluid flow with the FBN is commonly referred to as a pulsating flow.

The pumps are typically used in fluid control systems with a valve. The valve may be a proportional valve, although many other valves or flow controllers may be employed with the pumps. For example, a proportional valve downstream from the pump may control a flow rate of the fluid with a flow sensor. More specifically, the flow sensor may measure the flow rate of the fluid flowing through the conduit and provide a flow rate signal to the valve. The flow rate signal can be proportional to the measured flow rate of the fluid. Using the flow rate signal, the proportional valve may control the flow rate of the fluid through the conduit.

However, due to the FBN, the flow rate signal may also include noise. The noise can cause the flow controller to be unstable. For example, a position of the proportional valve may not correspond to a flow rate set point and, instead, may continuously oscillate about the set point. Accordingly, it is desirable to attenuate the pulses in the pulsating flow so the flow rate may be stable.

Some fluid control systems employ a signal from, for example, a pressure transducer to attenuate the pulses. More specifically, the pressure transducer may measure the pulses in the pulsating flow and provide a noise signal that corresponds to the pulses in the pulsating flow. The noise signal may be used to provide a noise reference that is employed to generate a signal that, when applied to the pulsating flow, cancels the pulses. In effect, the signal applied to the pulsating flow is a cancelling signal. The cancelling signal may be 180 degrees out of phase with the noise reference and, therefore, 180 degrees out of phase with the pulses. Accordingly, the fluid flow becomes smoother, thereby providing a more stable fluid flow.

However, the pressure transducer may not have sufficient bandwidth to convert all of the pulses into the noise reference. For example, the pulses may have high frequency components that are greater than the cutoff frequency of the pressure transducer's passband. In addition, the pressure transducer is a separate device from the flow controller and other components in the fluid control system. As a result, the pressure transducer is an additional undesirable hardware cost.

These and other issues may be resolved by obtaining a noise reference from the components in the fluid control system already being employed to control the flow rate of the fluid. For example, the flow sensor may have sufficient bandwidth to measure the pulses in the pulsating flow. If the noise reference could be obtained from a flow signal provided by the flow sensor, then pressure transducer may not be necessary to attenuate the pulses. Accordingly, there is a need for active cancellation of a pulsating flow with a flow signal noise reference.

SUMMARY

An electronics for active cancellation of a pulsating flow with a flow signal noise reference is provided. According to an embodiment, the electronics comprises a signal processor configured to receive a flow signal from a flow sensor, the flow sensor being configured to measure a flow rate of the pulsating flow, generate a flow rate signal from the flow signal, generate a noise reference signal from the flow signal, and generate a cancelling signal from the noise reference signal. The electronics also comprises a controller communicatively coupled to the signal processor. The controller is configured to determine a flow rate control signal for controlling the flow rate of the fluid. In addition, the electronics comprises signal generator communicatively coupled to the signal processor and the controller. The signal generator is configured to receive the flow rate control signal, generate a valve signal based on the flow rate control signal and the cancelling signal, and provide the valve signal to a valve to control the flow rate and attenuate the one or more pulses of the pulsating flow of the fluid.

A method for active cancellation of a pulsating flow with a flow signal noise reference is provided. According to an embodiment, the method comprises receiving a flow signal from a flow sensor. The flow sensor is configured to measure a flow rate of the pulsating flow. According to the embodiment, the method also comprises generating a flow rate signal from the flow signal, generating a noise reference signal from the flow signal, and generating a cancelling signal from the noise reference signal. The method also comprises determining a flow rate control signal for controlling the flow rate of the fluid, receiving the flow rate control signal, and generating a valve signal based on the flow rate control signal and the cancelling signal. In addition, the method comprises providing the valve signal to a valve to control the flow rate and attenuate the one or more pulses of the pulsating flow of the fluid.

A system for active cancellation of a pulsating flow with a flow signal noise reference is provided. According to an embodiment, the system comprises a valve and a flow sensor fluidly coupled to the valve. The flow sensor is configured to measure a flow rate of the pulsating flow. According to the embodiment, the system also comprises an electronics communicatively coupled to the valve and the flow sensor. The electronics is configured to receive a flow signal from a flow sensor. The electronics is also configured to generate a flow rate signal from the flow signal, generate a noise reference signal from the flow signal, generate a cancelling signal from the noise reference signal, determine a flow rate control signal for controlling the flow rate of the fluid, and generate a valve signal based on the flow rate control signal and the cancelling signal. The electronics is also configured to provide the valve signal to a valve to control the flow rate and attenuate the one or more pulses of the pulsating flow of the fluid.

Aspects

According to an aspect, an electronics (100) for active cancellation of a pulsating flow with a flow signal noise reference comprises a signal processor (110) configured to receive a flow signal (220a) from a flow sensor (220), the flow sensor (220) being configured to measure a flow rate of the pulsating flow. The signal processor (110) is also configured to generate a flow rate signal (110a) from the flow signal (220a), generate a noise reference signal (220a') from the flow signal (220a), and generate a cancelling signal (110b) from the noise reference signal (220a'). According to the aspect, the electronics (100) also comprises a controller (120) communicatively coupled to the signal processor (110), the controller (120) being configured to determine a flow rate control signal (120a) for controlling the flow rate of the fluid. According to the aspect, the electronics (100) also includes a signal generator (130) communicatively coupled to the signal processor (110) and the controller (120), the signal generator (130) being configured to receive the flow rate control signal (120a), generate a valve signal (130a) based on the flow rate control signal (120a) and the cancelling signal (110b) and provide the valve signal (130a) to a valve (210) to control the flow rate and attenuate the one or more pulses of the pulsating flow of the fluid.

Preferably, the signal processor (110) being configured to generate a noise reference signal (220a') from the flow signal (220a) comprises the signal processor (110) being configured to receive the first feedback error (e1) from the noise reference signal (220a'), determine coefficients using the first feedback error (e1), and generate an estimate of a DC component in the flow signal (220a) using the coefficients.

Preferably, the signal processor (110) being configured to generate the cancelling signal (110b) from the flow signal (220a) comprises the signal processor (110) being configured to receive the noise reference signal (220a'), receive a second feedback error (e2) from the flow signal (220a), and generate the cancelling signal (110b) using the noise reference signal (220a') and the second feedback error (e2).

Preferably, the signal processor (110) is comprised of a first filter (112), the first filter (112) being comprised of a DC canceller that generates the noise reference signal (220a') from the flow signal (220a) by attenuating a DC component in the flow signal (220a).

Preferably, the signal processor is comprised of a second filter (114), the second filter (114) being an adaptive noise cancelling filter configured to generate the cancelling signal (110b) from the noise reference signal (220a') by adjusting at least one of a phase and amplitude of the noise reference signal (220a').

Preferably, the signal generator (130) is comprised of a pulse width modulator (132) and a valve drive circuit (134).

According to an aspect, a method for active cancellation of a pulsating flow with a flow signal noise reference comprises receiving a flow signal from a flow sensor, the flow sensor being configured to measure a flow rate of the pulsating flow, generating a flow rate signal from the flow signal, generating a noise reference signal from the flow signal, generating a cancelling signal from the noise reference signal, determining a flow rate control signal for controlling the flow rate of the fluid, receiving the flow rate control signal, generating a valve signal based on the flow rate control signal and the cancelling signal, and providing the valve signal to a valve to control the flow rate and attenuate the one or more pulses of the pulsating flow of the fluid.

Preferably, generating a noise reference signal from the flow signal comprises receiving the first feedback error from the noise reference signal, determining coefficients using the first feedback error, and generating an estimate of a DC component in the flow signal using the coefficients.

Preferably, generating the cancelling signal from the flow signal comprises receiving the noise reference signal, receiving a second feedback error from the flow signal, and generating the cancelling signal using the noise reference signal and the second feedback error.

Preferably, generating the noise reference signal comprises attenuating a DC component in the flow signal with a first filter.

Preferably, generating the flow rate signal comprises attenuating a noise component in the flow signal with a first filter.

According to an aspect, a system (10) for active cancellation of a pulsating flow with a flow signal noise reference comprises a fluid control system (200) comprising a valve (210) and a flow sensor (220) fluidly coupled to the valve (210), the flow sensor (220) being configured to measure a flow rate of the pulsating flow. Also according to the aspect, the system (10) comprises an electronics (100) communicatively coupled to the valve (210), and the flow sensor (220), the electronics (100) configured to receive a flow signal (220a) from a flow sensor (220), generate a flow rate signal (110a) from the flow signal (220a), generate a noise reference signal (220a') from the flow signal (220a), generate a cancelling signal (110b) from the noise reference signal (220a'), determine a flow rate control signal (120a) for controlling the flow rate of the fluid, generate a valve signal (130a) based on the flow rate control signal (120a) and the cancelling signal (110b), and provide the valve signal (130a) to a valve (210) to control the flow rate and attenuate the one or more pulses of the pulsating flow of the fluid.

Preferably, the electronics (100) being configured to generate the noise reference signal (220a') from the flow signal (220a) comprises the electronics (100) being configured to receive the first feedback error (e1) from the noise reference signal (220a'), determine coefficients using the first feedback error (e1), and generate an estimate of a DC component in the flow signal (220a) using the coefficients.

Preferably, the electronics (100) being configured to generate the cancelling signal (110b) from the flow signal (220a) comprises the electronics (100) being configured to receive the noise reference signal (220a'), receive a second feedback error (e2) from the flow signal (220a), and generate the cancelling signal (110b) using the noise reference signal (220a') and the second feedback error (e2).

Preferably, the fluid control system (200) further comprises a pump (230) and wherein the valve (210) is fluidly coupled to the pump (230).

BRIEF DESCRIPTION OF THE DRAWINGS

The same reference number represents the same element on all drawings. It should be understood that the drawings are not necessarily to scale.

DETAILED DESCRIPTION

FIGS. 1-6 and the following description depict specific examples to teach those skilled in the art how to make and use the best mode of embodiments of active cancellation of a pulsating flow with a flow signal noise reference. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the active cancellation of the pulsating flow with the flow signal noise reference. As a result, the embodiments described below are not limited to the specific examples described below, but only by the claims and their equivalents.

A System for Active Cancellation of a Pulsating Flow

Figure 1:
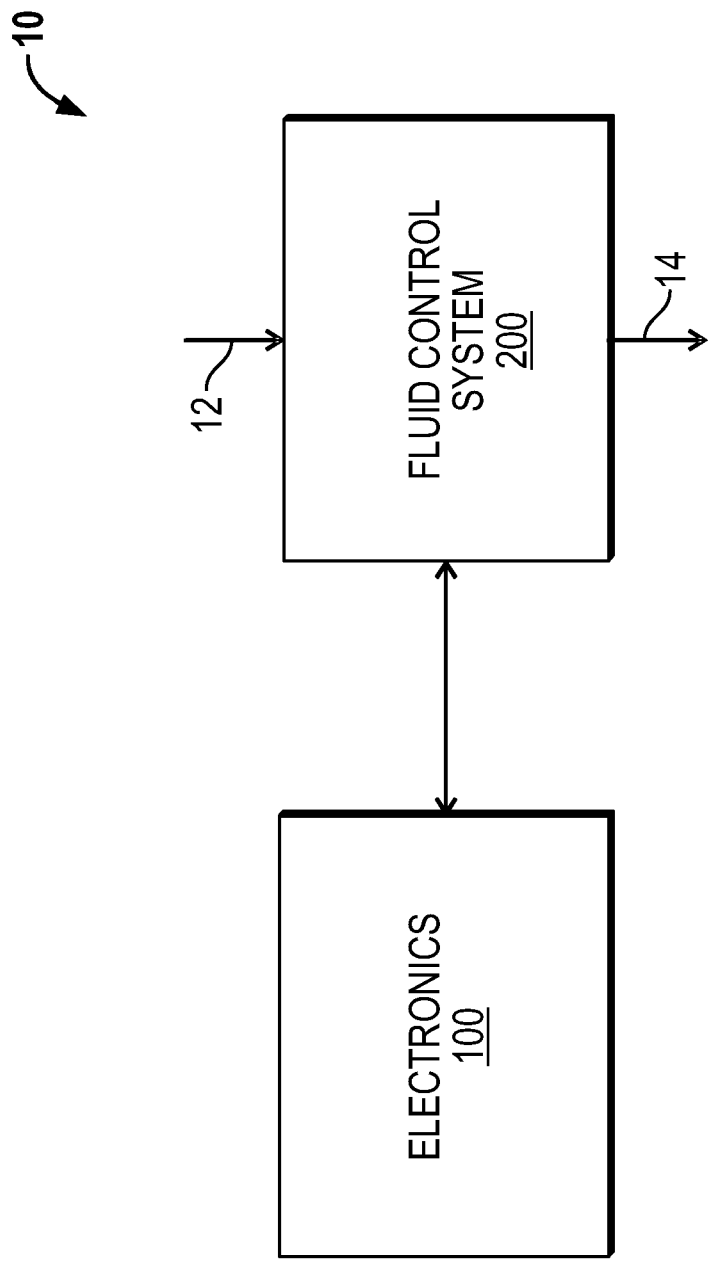
FIG. 1 shows a system 10 for active cancellation of a pulsating flow with a flow signal noise reference according to an embodiment.

FIG. 1 shows a system 10 for active cancellation of a pulsating flow with a flow signal noise reference according to an embodiment. As shown in FIG. 1, the system 10 includes an electronics 100 communicatively coupled to a fluid control system 200. The system 10 also includes a fluid supply 12, which is fluidly coupled to the fluid control system 200 via a conduit, pipeline, or the like. The fluid supply 12 may be fluidly coupled to the fluid control system 200 via a conduit, pipeline, or the like. The fluid may be any fluid, such as, for example, compressible or incompressible fluids, fluids with mixed phases, emulsions, suspensions, etc. The fluid control system 200 may control the fluid supplied by the fluid supply 12 to provide a fluid flow 14, which is illustrated by an arrow. The fluid control system 200 may include a pump with reciprocating motion and, therefore, may be prone to causing one or more pulses in the fluid flow 14.

The electronics 100 may receive a flow signal from, for example, a flow sensor in the fluid control system 200 and provide a valve signal to a flow controller in the fluid control system 200. The valve signal may be based on a flow rate control signal and a flow signal noise reference that are determined by the electronics 100. The flow rate control signal may be a signal that controls the flow rate of the fluid in fluid control system 200 and the flow signal noise reference may be a value that can attenuate a pulse that may be in the fluid flow 14. The electronics 100 may determine the flow rate control signal and the flow signal noise reference by employing the flow signal from the flow sensor in the fluid control system 200. Accordingly, the electronics 100 may attenuate the pulse in the fluid flow 14 with the flow signal noise reference, as will be explained in more detail in the following with reference to FIGS. 2-6.

Figure 2:
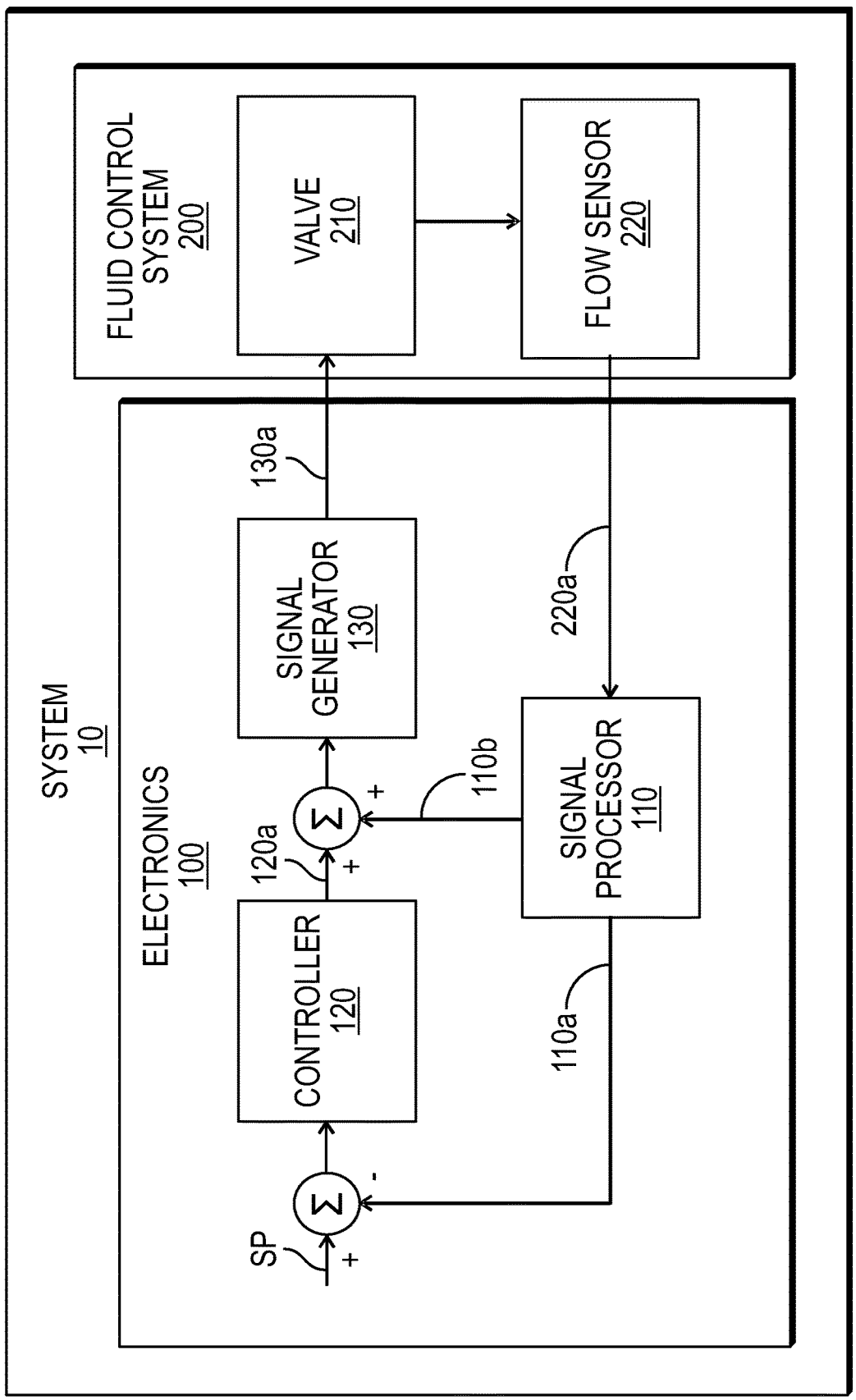
FIG. 2 shows a more detailed view of the system 10 for active cancellation of the pulsating flow with the flow signal noise reference.

FIG. 2 shows a more detailed view of the system 10 for active cancellation of the pulsating flow with the flow signal noise reference. As shown in FIG. 2, the system 10 includes the electronics 100 and the fluid control system 200 described in the foregoing. For clarity, the system 10 is not shown with the fluid supply 12 and the fluid flow 14. In the embodiment shown, the electronics 100 includes a signal processor 110, controller 120, and signal generator 130 that are communicatively coupled. The signal processor 110 and the signal generator 130 are also communicatively coupled to the fluid control system 200. More specifically, the signal processor 110 is configured to receive a signal from the flow sensor 220 and the signal generator 130 is configured to provide a signal to the valve 210.

As shown, the signal processor 110 receives a flow signal 220a from the flow sensor 220. The signal processor 110 employs the flow signal 220a to provide a flow rate signal 110a that is subtracted from a set point SP. The difference between the flow rate signal 110a and the set point SP is provided to the controller 120. The controller 120 receives the difference, determines a flow rate control signal 120a based on the difference, and provides the flow rate control signal 120a to the signal generator 130. The signal processor 110 also provides a cancelling signal 110b to the signal generator 130. The signal generator 130 is configured to receive the flow rate control signal 120a and the cancelling signal 110b. In the embodiment shown, the signal generator 130 receives a signal from a summation that adds the cancelling signal 110b and the flow rate control signal 120a. The signal generator 130 employs the cancelling signal 110b and the flow rate control signal 120a to provide a valve signal 130a to the valve 210.

The electronics 100 is configured to receive the flow signal 220a from the flow sensor 220 and, using the flow signal 220a, generate and provide the valve signal 130a to the valve 210. The electronics 100 can include any appropriate processing system that is configured to process the flow signal 220a to generate the valve signal 130a. For example, the electronics 100 may employ a processor, such as a digital signal processor ("DSP") configured to filter, delay, split, combine, amplify, attenuate, or the like the flow signal 220a. The electronics 100 may also include other electronics such as, for example, a microprocessor configured to receive the set point SP, compare the set point SP with a measured flow rate, and output the flow rate control signal 120a.

Signal Processor 110

In the embodiment shown, the signal processor 110 may include an analog-to-digital ("ADC"), DSP, and any other appropriate electronics configured to receive and convert the flow signal 220a into the flow rate signal 110a. For example, the flow signal 220a may be an analog signal that is comprised of a voltage that increases or decreases in proportion to the fluid flow rate. The signal processor 110 may include conditioning electronics that scales, filters, or the like, the flow signal 220a. The ADC may sample the conditioned flow signal 220a to provide a sequence of digitized samples to the DSP. Using the DSP, the signal processor 110 may filter the sequence of the digitized samples to provide the flow rate signal 110a and the cancelling signal 110b.

For example, the signal processor 110 may include one or more filters that separate a DC component and a high frequency component in the flow signal 220a. In the embodiment shown, the DSP may include a filter that attenuates the DC component from the flow signal 220a, thereby providing the noise component that is associated with the pulses in the pulsating flow. DSP may also include filters that attenuate the noise component in the flow signal 220a to generate a digital representation of a DC component in the flow signal 220a. As can be appreciated, the DC component of the flow signal 220a may be proportional to the measured flow rate of the fluid, but may not be proportional to the noise component associated with the pulses in the pulsating flow. Accordingly, the noise component may be employed to generate the cancelling signal 110b.

The cancelling signal 110b is a signal that corresponds to the noise component in the flow signal 220a. As was described in the foregoing, the noise component in the flow signal 220a may be due to pulses in the pulsating flow of the fluid in the fluid control system 200. In the embodiment show, the cancelling signal 110b is generated by sampling and digitizing the flow signal 220a after the flow signal 220a is filtered to remove the DC component. The cancelling signal 110b is provided to the signal generator 130 via the summation. More specifically, the cancelling signal 110b is summed with the flow rate control signal 120a by the summation between the signal generator 130 and controller 120.

Controller 120

The controller 120 employs the set point SP and the flow rate signal 110a to generate the flow rate control signal 120a. For example, in the embodiment shown, the controller 120 may be a proportional-integral-differential ("PID") controller, although alternative controllers may be employed in other embodiments. In the embodiment shown, a summation determines a difference between the set point SP and the flow rate signal 110a. The difference is typically referred to as an error between the set point SP and a measured process variable. The error is then multiplied with the PID parameters to determine a control variable. In the embodiment shown, the measured process variable is the flow rate signal 110a and the control variable is the flow rate control signal 120a.

The flow rate control signal 120a is a signal that corresponds to the error between the flow rate signal 110a and the set point SP. As can be appreciated, due to filtering in the signal processor 110, the flow rate control signal 120a is not generated from a signal with the noise component in the flow signal 220a. Accordingly, the flow rate control signal 120a may be stable even though the flow signal 220a may have a noise component associated with pulses in the pulsating flow. The flow rate control signal 120a is provided to the signal generator 130 along with the cancelling signal 110b.

Signal Generator 130

The signal generator 130 receives and converts the cancelling signal 110b and flow rate control signal 120a into the valve signal 130a. The valve signal 130a is a signal that controls the flow rate and actively cancels the pulsating flow of the fluid flowing through the fluid control system 200. The valve signal 130a may also include a component that causes the valve member in the valve 210 to, for example, periodically displace a portion of the fluid in the fluid control system 200 such that the pulses in the pulsating flow are attenuated, thereby providing an active cancellation of the pulsating flow provided by the pump 230.

Fluid Control System 200

The valve 210 may be a proportional valve that controls that fluid flow rate relative to a magnitude of the current in the valve signal 130a, although any suitable valve can be employed in alternative embodiments. In the embodiment shown, the valve 210 includes a valve member that is displaced in proportion to a current of a solenoid in the valve 210. For example, the valve member may have a profile that enlarges or reduces a size of an opening when the valve member is displaced by the current. Accordingly, the fluid flow may, for example, be linearly proportional to the current provided to the valve 210.

The valve member in the valve 210 may also rapidly oscillate in response to the valve signal 130a provided to the valve 210. For example, the valve member may have a small mass relative to the magnitude of the current provided to the valve 210. The pulses in the pulsating flow provided to the flow sensor 220 may therefore be attenuated.

In the embodiment shown, the flow sensor 220 is comprised of a mass flow meter that employs a sensor configured to respond quickly to changes in the flow rate. For example, the flow sensor 220 may employ a thermal dispersion sensor that transfers heat to the fluid from a heated surface. The heated surface may be a wire filament, film heater element, or the like. These are sometimes known as hot-wire or hot-film mass air flow ("MAF") sensors. The heat transfer does not occur to the bulk of the fluid flow, but in a thermal boundary layer around the heated surface. Accordingly, they are sometimes referred to as mass flux sensors. Other sensing technologies may be employed in alternative embodiments.

In thermal dispersion sensors, the heated surface may have a volume that is small relative to the fluid flow. As a result, the heat transfer rate changes rapidly in response to changes in the flow rate of the fluid. This characteristic makes them sensitive to local and rapid flow perturbations such as eddies and vortices, as well as pulsating or periodic variations in the bulk flow. The rapid response of the sensor to the changes in the flow rate of the fluid may be viewed as a low pass filter with a cut-off frequency high enough to detect all of the pulses or FBN in the pulsating flow. Therefore, the signal provided by the flow sensor 220 not only includes a DC component that corresponds to the fluid flow rate but also a noise component that corresponds to the pulses in the pulsating flow.

As will be explained in more detail in the following, the noise component may be employed to generate a noise reference signal that can be relied on to attenuate the pulses in the pulsating fluid flow.

Detailed View of the System 10

Figure 3:
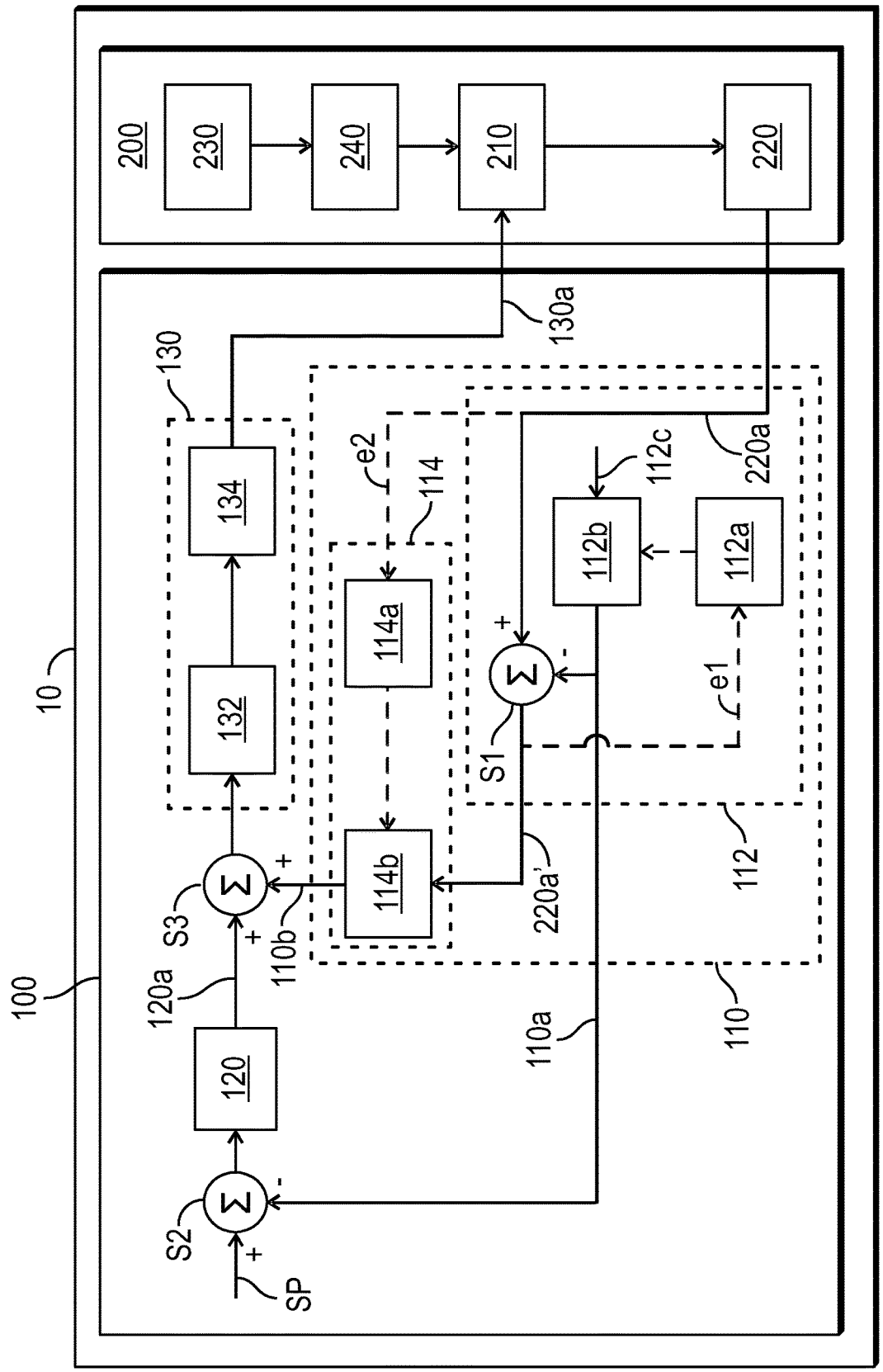
FIG. 3 shows a view with additional details of the system 10 for active cancellation of the pulsating flow with the flow signal noise reference.

FIG. 3 shows a view with additional details of the system 10 for active cancellation of the pulsating flow with the flow signal noise reference. As shown in FIG. 3, the system 10 includes the electronics 100 and the fluid control system 200 described in the foregoing with reference to FIGS. 1 and 2. The signal processor 110, controller 120, and signal generator 130 as well as the set point SP, flow rate signal 110a, cancelling signal 110b, flow rate control signal 120a, valve signal 130a, and flow signal 220a are also shown. In the more detailed view, the signal generator 130 includes a pulse width modulator 132 communicatively coupled with a valve drive circuit 134. The valve signal 130a is provided by the valve drive circuit 134. In addition, the signal processor 110 includes a first filter 112 that provides the flow rate signal 110a. The signal processor 110 also includes a second filter 114 that provides the cancelling signal 110b.

In addition to the valve 210 and the flow sensor 220 shown in FIG. 2, the fluid control system 200 includes a pump 230 and a pressure regulator 240. In the embodiment shown, the pump 230 may be a local air generator with pistons that compresses air for use in a pneumatic system. Using a local air generator may be advantageous over, for example, bottled air due to smaller utilized space, sustained supply, etc. However, the pump 230 may be prone to providing compressed air with pulsating flow. The pressure regulator 240 may control the pressure to prevent the compressed air from deviating from a desired pressure level. However, in alternative embodiments, other configurations may be employed. The pulses may also be caused by something other than the pump 230. In the embodiment shown, the pump 230 may receive fluid from a fluid supply and provide the fluid, via the pressure regulator 240, to the valve 210 and the flow sensor 220. The flow sensor 220 may measure the flow rate of the fluid provided by the pump 230 to provide the flow signal 220a. The filters 112, 114 employ the flow signal 220a to generate the flow rate signal 110a and the cancelling signal 110b, as will be explained in more detail in the following.

Filters

A first adaptive algorithm 112a in the first filter 112 may receive a first feedback error e1 from the noise reference signal 220a'. More specifically, the first adaptive algorithm 112a is configured to receive the flow signal 220a from the flow sensor 220. The first adaptive algorithm 112a is also communicatively coupled to a first digital filter 112b. A DC reference 112c is provided to the first digital filter 112b. The DC reference 112c is set at a constant value, such as '1', although any suitable value may be employed in alternative embodiments. A first summation S1 is shown proximate to the first digital filter 112b, which receives the flow signal 220a from the flow sensor 220 and the flow rate signal 110a from the first digital filter 112b. The first digital filter 112b is configured to receive the DC reference 112c and, using the DC reference 112c, provide the flow rate signal 110a. The flow rate signal 110a is provided to the first and second summation S1, S2.

A second adaptive algorithm 114a in the second filter 114 may receive a second feedback error e2 from the flow signal 220a. The second adaptive algorithm 114a is communicatively coupled to a second digital filter 114b in the second filter 114. The second digital filter 114b is communicatively coupled to and configured to receive a noise reference signal 220a' from the first summation S1. The second digital filter 114b is configured to receive the noise reference signal 220a' from the first summation S1 and, using the noise reference signal 220a', generate the cancelling signal 110b. The cancelling signal 110b is provided to a third summation S3.

The adaptive algorithms 112a, 114a may determine and provide coefficients to the digital filters 112b, 114b based on the received feedback errors e1, e2. The adaptive algorithms 112a, 114a may be any appropriate algorithms that are configured to calculate the coefficients for the digital filters 112b, 114b. For example, in the embodiment shown, the adaptive algorithms 112a, 114a may be least means square ("LMS") algorithms. The digital filters 112b, 114b may filter their respectively received signals using the coefficients determined by their respective adaptive algorithms 112a, 114a. For example, the digital filters 112b, 114b may be finite impulse response ("FIR") with N number of taps from their respectively received signals. Each of the taps may have an associated coefficient determined by the adaptive algorithms 112a, 114a.

In the embodiment shown, the first adaptive algorithm 112a is configured to receive the first feedback error e1 from the noise reference signal 220a'. The first adaptive algorithm 112a determines and provides coefficients to the first digital filter 112b. The first digital filter 112b operates on the DC reference 112c to determine the flow rate signal 110a, which may be an estimate of the DC component in the flow sensor 220. The flow rate signal 110a is subtracted from the flow signal 220a by the first summation S1. Because the flow rate signal 110a is an estimate of the DC component in the flow signal 220a, the output from the first summation S1 is the noise reference signal 220a', which is an estimate of the noise component in the flow signal 220a.

In the embodiment shown, the second adaptive algorithm 114a is configured to receive the second feedback error e2 and, using the second feedback error e2, determine coefficients for the second digital filter 114b. More specifically, the second feedback error e2 is associated with the flow signal 220a from the flow sensor 220. Accordingly, the coefficients determined from the second feedback error e2 may ensure that the second digital filter 114b filters the noise reference signal 220a' so that the phase and the amplitude of the cancelling signal 110b are appropriate for attenuating the pulses in the pulsating flow. The following describes a method that employs the cancelling signal 110b to cancel to the pulsating flow.

Method for Active Cancellation of a Pulsating Flow

Figure 4:
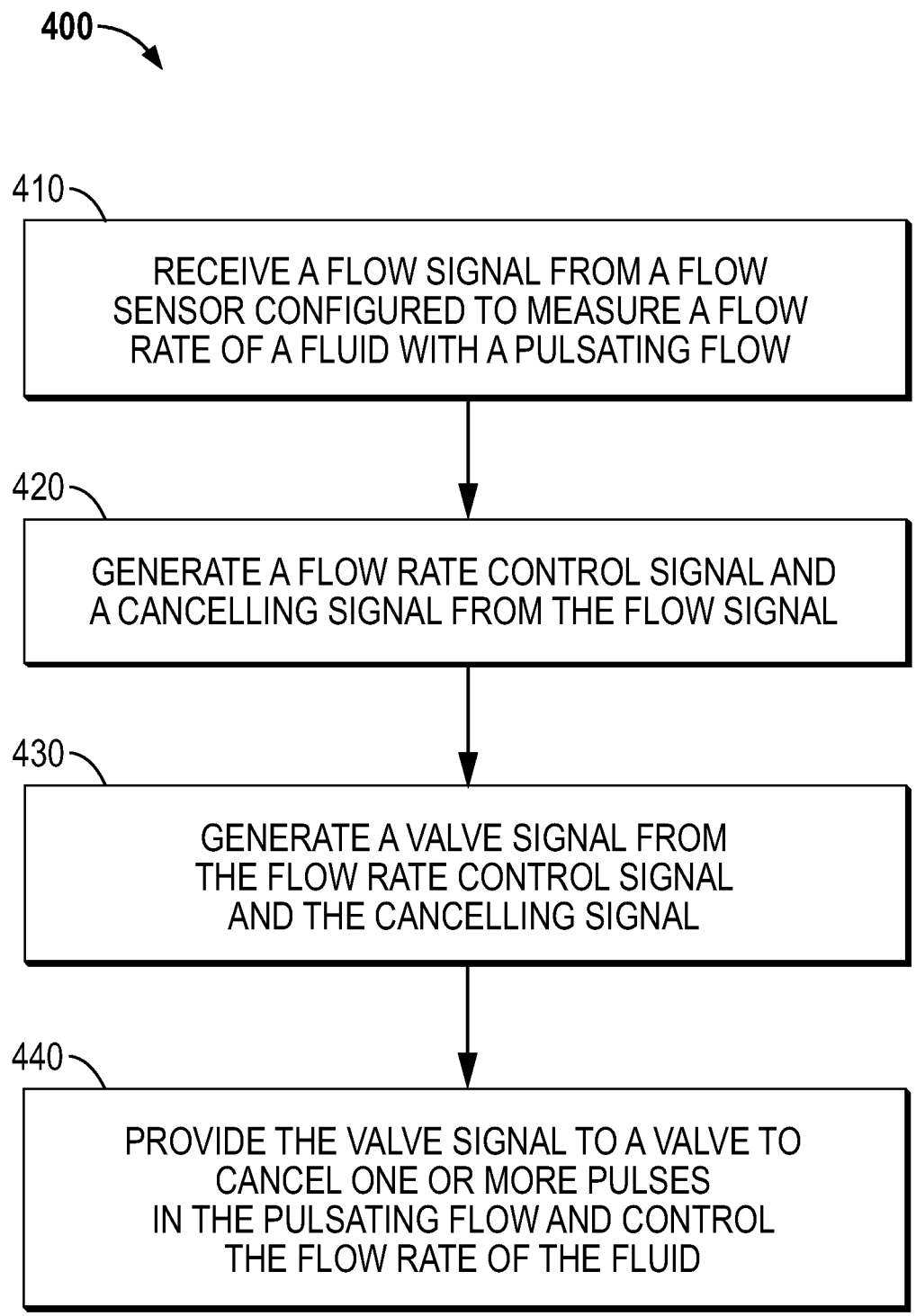
FIG. 4 shows a method 400 for active cancellation of a pulsating flow with a flow signal noise reference according to an embodiment.

FIG. 4 shows a method 400 for active cancellation of a pulsating flow with a flow signal noise reference according to an embodiment. The method 400 may be performed by the electronics 100 described in the foregoing, although any suitable electronics may be employed in alternative embodiments. The method 400 begins with step 410 by receiving a flow signal from a flow sensor configured to measure a flow rate of a fluid with a pulsating flow. In step 420, the method 400 generates a flow rate control signal and a cancelling signal from the flow signal, which may be generated by the signal processor 110 and controller 120 described in the foregoing with reference to FIGS. 2 and 3. The method 400 provides the flow rate control signal and the cancelling signal to a signal generator, which may be the signal generator 130 described in the foregoing.

The flow signal may be an analog signal with a voltage that is proportional to the flow rate of the fluid with the pulsating flow. Accordingly, in electronics that include digital signal processing, the step 410 of receiving the flow signal may include conditioning, sampling, and quantizing the flow signal, although receiving the flow signal may include any appropriate signal processing in alternative embodiments. Due to being performed with digital signal processing, step 410 results in a digital representation of the flow signal.

Generating the flow rate control signal and the cancelling signal from the flow signal in step 420 may include separating the flow signal into a flow rate signal and a noise reference signal. In an embodiment, separating the flow signal into the flow rate signal and the noise reference signal may include attenuating a DC component and a high frequency component from the flow signal. The flow rate control signal may be generated from the flow rate signal by employing, for example, a PID controller.

In step 430, the valve signal may be generated, in an embodiment, from a summation of the flow rate control signal and the cancelling signal. The summation may be performed by the third summation S3 described in the foregoing with reference to FIG. 3. The summation of the flow rate control signal and the cancelling signal may therefore be a complex signal with, for example, a digital representation of a DC component, such as a first sequence digital values that represent an output from the controller 120 and a second sequence of digital values that represent an output from the signal processor 110.

In step 440, the valve signal may be provided to the valve, such as the valve 210 described in the foregoing. The valve signal may move a valve member in the valve to both control the flow rate of the pulsating flow and attenuate one or more pulses in the pulsating flow. For example, the method 400 may provide a valve signal with the cancelling signal that moves a valve member in the valve to attenuate the pulses and a DC component that moves the valve member to ensure that the flow rate is moving towards or remains as the desired flow rate. The desired flow rate may be the set point SP described in the foregoing.

The valve signal may be generated by summing the flow rate control signal with the cancelling signal while the second adaptive algorithm 114a iteratively generates the coefficients and the second digital filter 114b filters the noise reference signal 220a'. Accordingly, the cancelling signal 110b is continuously being adjusted to minimize the noise in the flow signal 220a. As a result, the valve signal 130a is also continuously being adjusted to attenuate the pulses in the pulsating flow, as will be described in more detail in the following by referring to exemplary flow signals.

Exemplary Signals

Figure 5:
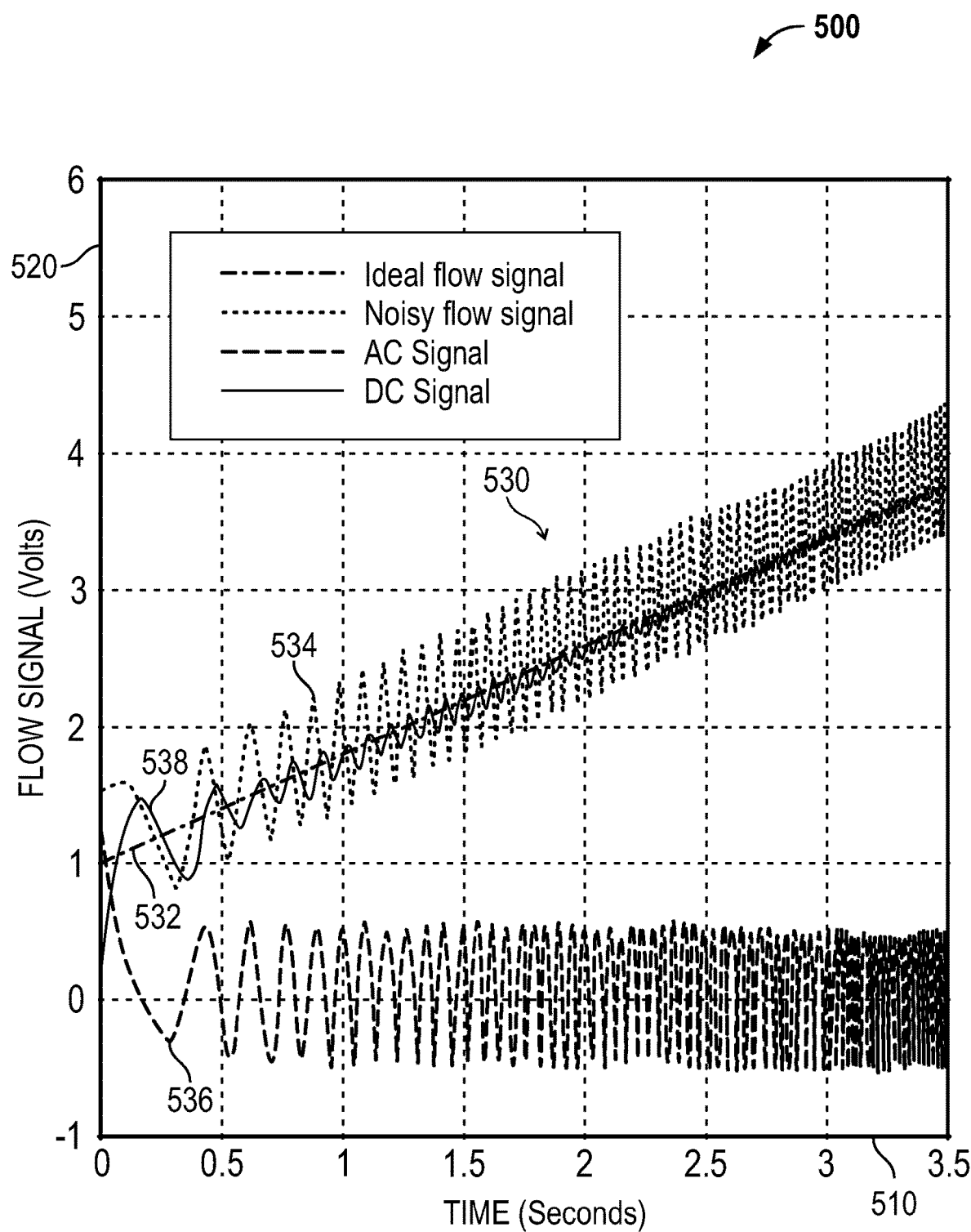
FIG. 5 shows a graph 500 illustrates signals for active cancellation of a pulsating flow with a flow signal noise reference according to an embodiment.

FIG. 5 shows a graph 500 illustrating signals for active cancellation of a pulsating flow with a flow signal noise reference according to an embodiment. The graph 500 includes an abscissa, which is a time axis 510, and an ordinate, which is a flow signal axis 520. The time axis 510 is in units of seconds and the flow signal axis 520 is in units of volts, although any suitable units may be employed in alternative embodiments. Also shown is a legend to assist in understanding the graph 500. The graph 500 also includes signals 530. The signals 530 are comprised of an ideal flow plot 532, non-cancelled flow signal plot 534, noise reference plot 536, and flow rate plot 538. Alternative embodiments of the signals 530 may include more or fewer and/or different flow signals. The signals 530 may be compared to illustrate the active cancellation of the pulsating flow.

In the embodiment shown, the ideal flow plot 532 illustrates a desirable flow rate over time. The desirable flow rate may be the set point SP described in the foregoing. As can be appreciated from FIG. 5, the ideal flow plot 532 increases linearly over time from about 1 volt to about 3.7 volts. However, in alternative embodiments, the ideal flow plot 532 may non-linearly increase or decrease, be constant, or the like.

The non-cancelled flow signal plot 534 may be the flow signal 220a described in the foregoing without the active cancellation of the pulsating flow. That is, the pulses in the pulsating flow are not being cancelled by the valve signal 130a. Therefore, the flow signal 220a provided by the flow sensor 220 may include the noise associated with the pulses in the pulsating flow. As can be appreciated, the non-cancelled flow signal plot 534 trends at a rate that is consistent with the ideal flow plot 532.

The noise in the non-cancelled flow signal plot 534 is illustrated as oscillations. As can be appreciated, the frequency of the oscillations is increasing over time. That is, as time increases, the time-period between each cycle is decreasing. Therefore, a passive filter with a cutoff frequency that is greater than the lowest frequency (at 0 seconds) and less than the highest frequency of the non-cancelled flow signal plot 534 (at 3.5 seconds) may not attenuate all of the noise in the non-cancelled flow signal plot 534.

The noise reference plot 536 may be the noise reference signal 220a' described in the foregoing, which are provided by the first filter 112. As can be appreciated from FIG. 5, the noise reference plot 536 does not trend with the ideal flow plot 532. Accordingly, the oscillations of the noise reference plot 536 correspond to the oscillations of the non-cancelled flow signal plot 534. That is, the phase and magnitude of the oscillations in the noise reference plot 536 are about the same as the phase and magnitude of the oscillations in the non-cancelled flow signal plot 534. Therefore, the noise reference plot 536 may be employed by an adaptive filter, such as the second filter 114 described in the foregoing, to cancel the pulses of the pulsating flow.

The flow rate plot 538 may be the flow signal 220a described in the foregoing with reference to FIGS. 3 and 4. As can be appreciated, the flow rate plot 538 includes oscillations that correspond to the oscillations in the flow signal plot 534. However, the magnitude of the oscillations in the flow rate plot 538 decrease as the time increases. This indicates that the pulses in the pulsating flow stream are being attenuated. For example, from zero to about 2 seconds, the coefficients determined by the second adaptive algorithm 114a may converge to a solution that tracks the increasing frequency of the noise in the flow signal 220a. Accordingly, the amplitude of the oscillations in the flow rate plot 538 decrease even though the frequency of the oscillations in the flow signal plot 534 increase.

Figure 6:
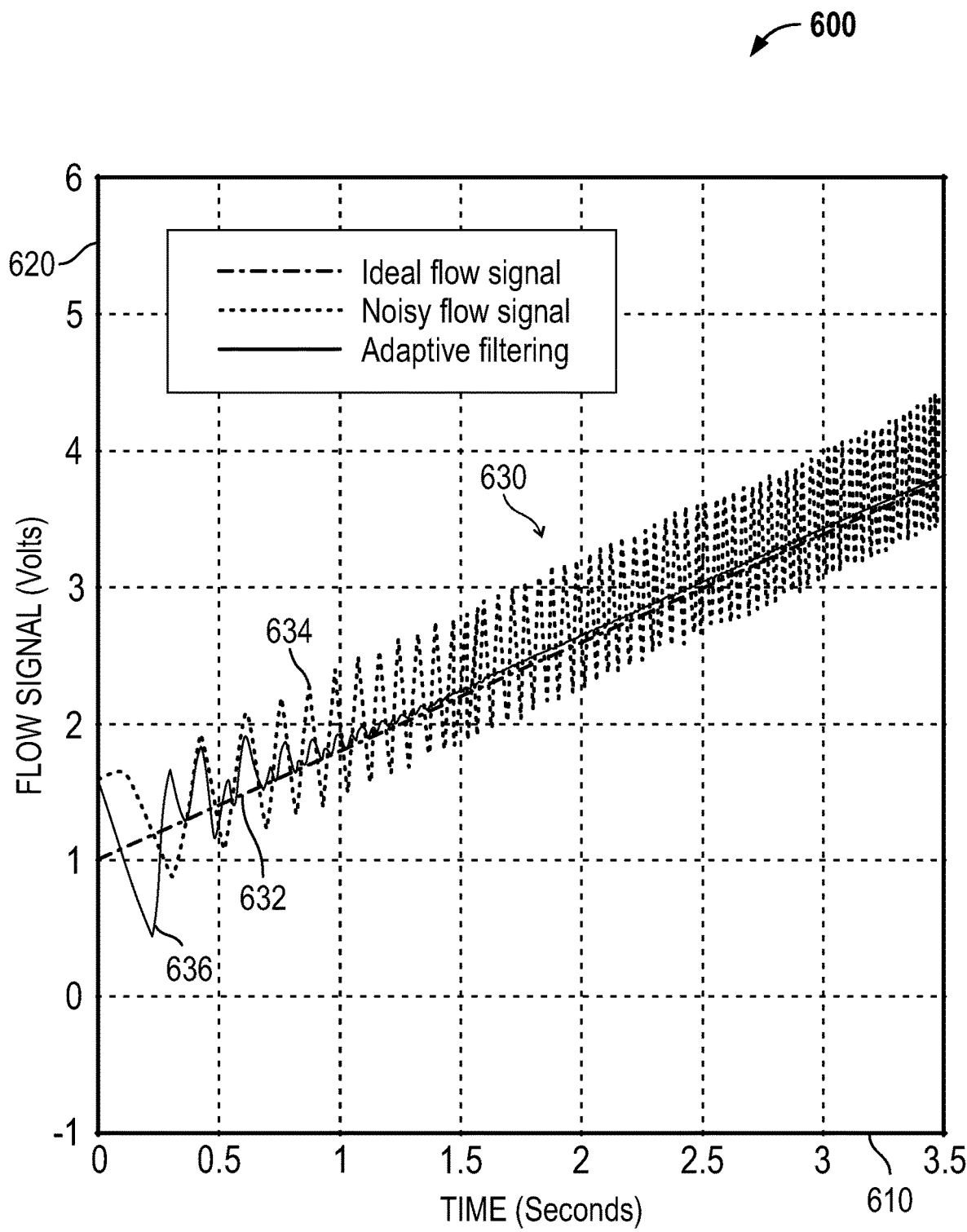
FIG. 6 shows a graph 600 with exemplary flow signals illustrating the signals received and generated by the active cancellation of a pulsating flow.

FIG. 6 shows a graph 600 with exemplary flow signals illustrating the signals received and generated by the active cancellation of a pulsating flow. The graph 600 includes an abscissa, which is a time axis 610, and an ordinate, which is a flow signal axis 620. The time axis 610 is in units of seconds and the flow signal axis 620 is in units of volts, although any suitable units may be employed in alternative embodiments. Also shown is a legend to assist in understanding the graph 600. The graph 600 also includes signals 630.

The signals 630 include an ideal flow plot 632, a non-cancelled flow signal plot 634, and a flow rate plot 636. The ideal flow plot 632 may be the same as the ideal flow plot 532 described in the foregoing with reference to FIG. 5. Similarly, the non-cancelled flow signal plot 634 may be the same as the non-cancelled flow signal plot 534 described in the foregoing with reference to FIG. 5. Alternative embodiments of the signals 630 may include more or fewer and/or different flow signals. The signals 630 may be compared to illustrate the active cancellation of the pulsating flow.

The flow rate plot 636 may be the flow rate signal 110a described in the foregoing with reference to FIGS. 3 and 4. As can be appreciated, the flow rate plot 636 includes oscillations that correspond to the oscillations in the non-cancelled flow signal plot 634. There are also perturbations that may be due to the adaptive filtering. However, the magnitude of the oscillations in the flow rate plot 636 decreases with respect to time. As can also be appreciated, the magnitude of the oscillations in the flow rate plot 636 decrease even though the frequency of the oscillations in the flow signal plot 634 increase.

Operation of an Active Cancellation of a Pulsating Flow

To illustrate how the signals 530, 630 may be employed to attenuate pulses in a pulsating flow, we refer to the embodiments described in the foregoing with reference to FIGS. 3-4. However, embodiments described with reference to FIGS. 3-4 may employ any appropriate signals. As described in the foregoing, the first filter 112 receives the flow signal 220a from the flow sensor 220 and generates the flow rate signal 110a. The first filter 112 also generates the noise reference signal 220a', which is provided to the second digital filter 114b. The second digital filter 114b adjusts the magnitude, phase, frequency, or the like, of the noise reference signal 220a' to provide cancelling signal 110b appropriate for attenuating the pulses in the pulsating stream. To adjust the noise reference signal 220a', the second digital filter 114b may employ the coefficients generated by the second adaptive algorithm 114a.

The first adaptive algorithm 112a in the first filter 112 may also receive the first feedback error e1 from the first summation S1. Using the first feedback error e1, the first adaptive algorithm 112a can provide coefficients to the first digital filter 112b. The first digital filter 112b also receives the DC reference 112c, which serves as a signal the first digital filter 112b operates on. Accordingly, the first digital filter 112b employs the DC reference 112c to generate the noise reference signal 220a', which is illustrated by the noise reference plot 536 shown in FIG. 5.

To generate the noise reference signal 220a', the first adaptive algorithm 112a iteratively adjusts the coefficients provided to the first digital filter 112b based on the first feedback error e1 such that the DC component in the flow signal 220a is attenuated. For example, the first adaptive algorithm 112a may adjust the coefficients provided to the first digital filter 112b according to the LMS algorithm, which minimizes the first feedback error e1 received from the first summation S1. However, any suitable algorithm may be employed in alternative embodiments.

Referring to the noise reference plot 536 shown in FIG. 5, the DC component has been filtered from the flow signal plot 534. Accordingly, the noise reference plot 536 does not increase over time. In addition, the noise reference plot 536 symmetrically oscillates about zero volts. The noise reference plot 536 may be generated by subtracting the flow rate signal 110a provided by the first digital filter 112b from the flow signal 220a at the first summation S1. That is, the flow rate signal 110a provided by the first digital filter 112b tracks the increasing DC component in the flow signal plot 534 and, therefore, when the flow rate signal 110a is subtracted from the flow signal plot 534, the output may be the noise reference plot 536.

The second filter 114 employs the noise reference signal 220a' to provide the cancelling signal 110b. For example, the second filter 114 may receive a signal represented by the noise reference plot 536 shown in FIG. 5 and, using an adaptive filter, adjust the phase and magnitude of the noise reference plot 536 to attenuate the pulses in the pulsating flow. For example, the second adaptive algorithm 114a may receive the second feedback error e2 from the flow signal 220a. The second adaptive algorithm 114a may iteratively generate and provide the coefficients to the second digital filter 114b to attenuate the pulses in the pulsating flow.

Due to the iterative adjustment of the coefficients provided to the second digital filter 114b, the pulses in the pulsating flow may attenuate over time. This is illustrated by the flow rate plot 538 shown in FIG. 5. As can be appreciated, the coefficients provided by the first adaptive algorithm 112a at zero seconds are different than the coefficients provided by the first adaptive algorithm 112a at 3.5 seconds. As can also be appreciated, the second feedback error e2 is also minimized as time increases. This minimization may be done by employing a LMS algorithm, as described in the foregoing with reference to FIGS. 3-5.

The embodiments described above provide a system 10 that includes electronics 100 for active cancellation of pulses in a pulsating flow with a flow signal noise reference. The electronics 100 can use a noise reference signal 220a' generated from the flow signal 220a, thereby providing an accurate representation of the noise in the flow signal 220a. The noise reference signal 220a' may be generated by the first filter 112. The second filter 114 uses the noise reference signal 220a' to generate the cancelling signal 110b.

The first filter 112 also generates a flow rate signal 110a from the flow signal 220a. The flow rate signal 110a may have attenuated or no noise. Since the flow rate signal 110a may have attenuated or no noise, the difference between the set point SP and the flow rate signal 110a is stable and an accurate representation of the difference between the flow rate of the pulsating flow and the set point SP. Accordingly, the valve 210 may stably move towards or remain at the set point SP even though there may be pulses in the pulsating flow.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other active cancellation of pulses in a pulsating stream with a flow signal noise reference. Accordingly, the scope of the embodiments described above should be determined from the following claims.

I claim:

1. An electronics for active cancellation of a pulsating flow with a flow signal noise reference, the electronics comprising:
   a signal processor configured to:
      receive a flow signal from a flow sensor, the flow sensor being configured to measure a flow rate of the pulsating flow;
      generate a flow rate signal from the flow signal;
      generate a noise reference signal from the flow signal; and
      generate a cancelling signal from the noise reference signal;

a controller communicatively coupled to the signal processor, the controller being configured to determine a flow rate control signal for controlling the flow rate of the fluid; and a signal generator communicatively coupled to the signal processor and the controller, the signal generator being configured to:
receive the flow rate control signal;
generate a valve signal configured to control the flow rate and attenuate one or more pulses of the pulsating flow based on the flow rate control signal and the cancelling signal; and
provide the valve signal to a valve;
wherein the signal processor being configured to generate the noise reference signal from the flow signal comprises the signal processor being configured to:
receive a first feedback error from the noise reference signal;
determine coefficients using the first feedback error; and
generate an estimate of a DC component in the flow signal using the coefficients.

2. The electronics of claim 1, wherein the signal processor being configured to generate the cancelling signal from the flow signal comprises the signal processor being configured to:
receive the noise reference signal;
receive a second feedback error from the flow signal; and
generate the cancelling signal using the noise reference signal aid the second feedback error.

3. The electronics of claim 1, wherein the signal processor is comprised of a first filter, the first filter being comprised of a DC canceller that generates the noise reference signal from the flow signal by attenuating a DC component in the flow signal.

4. The electronics of claim 1, wherein the signal processor is comprised of a second filter, the second filter being an adaptive noise cancelling filter configured to generate the cancelling signal from the noise reference signal by adjusting at least one of a phase and amplitude of the noise reference signal.

5. The electronics of claim 1, wherein the signal generator is comprised of a pulse width modulator and a valve drive circuit.

6. A method for active cancellation of a pulsating flow with a flow signal noise reference, the method comprising:
receiving a flow signal from a flow sensor, the flow sensor being configured to measure a flow rate of the pulsating flow;
generating a flow rate signal from the flow signal;
generating a noise reference signal from the flow signal;
generating a cancelling signal from the noise reference signal;
determining a flow rate control signal for controlling the flow rate of the fluid;
receiving the flow rate control signal;
generating a valve signal based on the flow rate control signal and the cancelling signal; and
providing the valve signal to a valve to control the flow rate and attenuate one or more pulses of the pulsating flow of the fluid;
wherein generating the noise reference signal from the flow signal comprises:
receiving a first feedback error from the noise reference signal;
determining coefficients using the first feedback error; and
generating an estimate of a DC component in the flow signal using the coefficients.

7. The method of claim 6, wherein generating the cancelling signal from the flow signal comprises:
receiving the noise reference signal;
receiving a second feedback error from the flow signal; and
generating the cancelling signal using the noise reference signal and the second feedback error.

8. The method of claim 6, wherein generating the noise reference signal comprises attenuating a DC component in the flow signal with a first filter.

9. The method of claim 6, wherein generating the flow rate signal comprises attenuating a noise component in the flow signal with a second filter.

10. A system for active cancellation of a pulsating flow with a flow signal noise reference, the system comprising:
a fluid control system comprising:
a valve; and
a flow sensor fluidly coupled to the valve, the flow sensor being configured to measure a flow rate of the pulsating flow; and
an electronics communicatively coupled to the valve and the flow sensor, the electronics configured to:
receive a flow signal from a flow sensor;
generate a flow rate signal from the flow signal;
generate a noise reference signal from the flow signal;
generate a cancelling signal from the noise reference signal;
determine a flow rate control signal for controlling the flow rate of the fluid;
generate a valve signal based on the flow rate control signal and the cancelling signal; and
provide the valve signal to a valve to control the flow rate and attenuate one or more pulses of the pulsating flow of the fluid;
wherein the electronics being configured to generate the noise reference signal from the flow signal comprises the electronics being configured to:
receive a first feedback error from the noise reference signal;
determine coefficients using the first feedback error; and
generate an estimate of a DC component in the flow signal using the coefficients.

11. The system of claim 10, wherein the electronics being configured to generate the cancelling signal from the flow signal comprises the electronics being configured to:
receive the noise reference signal;
receive a second feedback error from the flow signal; and
generate the cancelling signal using the noise reference signal and the second feedback error.

12. The system of claim 10, wherein the fluid control system further comprises a pump and wherein the valve is fluidly coupled to the pump.

* * * * *